United States Patent [19]

Ohkawa et al.

[11] Patent Number: 4,929,485
[45] Date of Patent: May 29, 1990

[54] INFORMATION STORAGE MEDIUM AND METHOD OF MANUFACTURING THE SAME

[75] Inventors: Hideki Ohkawa, Tokyo; Norio Ozawa, Kawasaki, both of Japan

[73] Assignee: Kabushiki Kaisha Toshiba, Kawasaki, Japan

[21] Appl. No.: 302,680

[22] Filed: Jan. 27, 1989

[30] Foreign Application Priority Data

Feb. 1, 1988 [JP] Japan .................................. 63-19684

[51] Int. Cl.$^5$ .............................................. B32B 3/02
[52] U.S. Cl. ........................................ 428/64; 428/65;
428/323; 428/328; 428/913; 430/945; 369/288;
346/76 L; 346/135.1; 264/104; 264/109;
427/53.1
[58] Field of Search ............... 369/288; 4/64, 65, 323,
4/328, 913; 430/945; 346/76 L, 135.1; 264/104,
109; 427/53.1

[56] References Cited

FOREIGN PATENT DOCUMENTS 8404824 12/1984 European Pat. Off. .
3030434 3/1981 Fed. Rep. of Germany .
3336445 4/1984 Fed. Rep. of Germany .
58-9234 1/1983 Japan .

OTHER PUBLICATIONS

M. Chen et al., "The Effect of Overcoats on the Ablative Writing Characteristics of Tellurium Films", J. Vac. Sci. Technol. 18(1), 1981, pp. 75-77.
Gerthsen, et al., "PhysiK", 10th Edition, 1969, pp. 401-403.
M. Andriollo, Electronik-Report, No. 6, 1975, pp. 83-86.

Primary Examiner—Patrick Ryan
Attorney, Agent, or Firm—Foley & Lardner, Schwartz, Jeffery, Schwaab, Mack, Blumenthal & Evans

[57] ABSTRACT

An information storage medium includes a substrate, and a recording layer formed on the substrate, which contains carbon, hydrogen, and Te. The recording layer has an amorphous state wherein no peak representing the presence of a crystal is confirmed by X-ray diffractometry, and an activation energy is 1.5 eV or more, which is required to transform the state of the recording layer from the amorphous state into a crystalline state wherein peaks each representing the presence of a crystal are confirmed by X-ray diffractometry.

22 Claims, 3 Drawing Sheets

INFORMATION STORAGE MEDIUM AND METHOD OF MANUFACTURING THE SAME

BACKGROUND OF THE INVENTION

1. Field of the Invention

The present invention relates to an information storage medium, such as an optical disk, on which information is recorded by radiating a light beam onto a recording layer to form a pit in the beam radiation portion, and from which information is reproduced by detecting a difference in optical characteristics between a pit portion and a non-pit portion, and a method of manufacturing the same.

2. Description of the Related Art

According to a known conventional information storage medium, in order to record information, a light beam is radiated onto a recording layer so that the beam radiation portion is melted or vaporized to form a pit.

A recording layer comprises a metal, semimetal, or semiconductor having a relatively low melting point, such as Te, so as to facilitate the formation of pits upon radiation of light beams (M. Chen and V. Marrello "The effect of overcoats on the ablative writing characteristics of tellurium films, J. Vac. Sci. Technol., 18(1), Jan./Feb. 1981).

An information storage medium having a recording layer containing carbon and hydrogen as well as Te is known (Japanese Patent Disclosure (Kokai) No. 58-9234). This information storage medium is advantageous in that carbon and hydrogen suppress oxidation of Te, which is susceptible to such, so as to allow additional data to be written on a recording layer which is stable over a comparatively long period of time Such an information storage medium is formed by sputtering of Te target in Ar gas atmosphere, together with $CH_4$ gas. Therefore, Te is dispersed in a matrix containing hydrocarbon in the resultant recording layer.

Even if the recording layer contains carbon and hydrogen through this operation, its stability, especially resistance to oxidation may degrade with the lapse of time. Even in such a case, the period over which recorded information retains its stability is often insufficient.

SUMMARY OF THE INVENTION

The present invention has been developed to eliminate the above-described drawback, and has as its object to provide an information storage medium which can maintain the stability of a recording layer, especially resistance to oxidation, for a long period of time.

According to the present invention, an information storage medium comprises a substrate; and a recording layer provided on the substrate and containing carbon, and M (M represents at least one type of element selected from the group consisting of a metal element, a semimetal element, and a semiconductor element). The recording layer includes an amorphous structure confirmed by X-ray diffractometry and an activation energy which is required to transform a state of the recording layer from the amorphous state into a crystalline state confirmed by X-ray diffractometry is 1.5 eV or more.

According to the present invention, a method of manufacturing an information storage medium comprises the steps of preparing a substrate; and forming a recording layer on the substrate such that the recording layer contains carbon, hydrogen, and M (M represents at least one type of element selected from the group consisting of a metal element, a semimetal element, and a semiconductor element). The recording layer includes an amorphous structure confirmed by X-ray-diffraction, and an activation energy which is required to transform a state of the recording layer from the amorphous state into a crystalline state confirmed by X-ray diffractometry is 1.5 eV or more.

In the present invention, an amorphous state is defined as a state in which no peak representing the presence of a crystal is confirmed by X-ray diffractometry and a crystalline state is defined as a state in which peaks each representing the presence of a crystal are confirmed by X-ray diffractometry.

BRIEF DESCRIPTION OF THE DRAWINGS

A more complete appreciation of the invention and many of the attendant advantages thereof will be more readily obtained through reference to the following detailed description and accompanying drawings, of which.

DETAILED DESCRIPTION OF THE PREFERRED EMBODIMENT

An embodiment of the present invention will be described in detail below with reference to the accompanying drawings.

Figure 1:
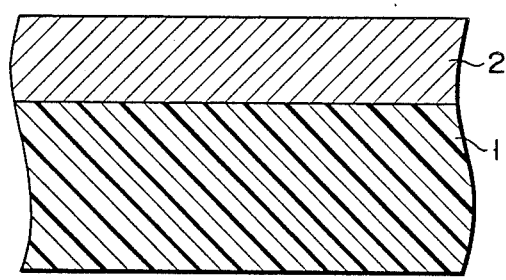
FIG. 1 is a sectional view of an information storage medium (optical disk) according to an embodiment of the present invention.

FIG. 1 is a sectional view of an information storage medium (optical disk) according to an embodiment of the present invention. Substrate 1 is made of a material which is resistant to change over a long period of time, such as a resin, e.g., polycarbonate, polymethyl methacrylate, epoxy, and glass. Recording layer 2 is formed on substrate 1. Recording layer 2 consists of carbon, hydrogen, and one of either a metal, semimetal, and/or semiconductor. When a light beam such as a laser beam is radiated onto recording layer 2, the irradiated portion is melted or vaporized to form a pit, thereby recording information. The metal, semimetal, or semiconductor serving as a constituent of recording layer 2 has a relatively low melting point so that a pit can be easily formed in recording layer 2. For example, Te, Se, Bi, Pb, Sb, Ag, Ga, As, or Ge can be used. Te or a Te-Ag alloy is preferably used. Recording layer 2 preferably has a thickness of about 100 to about 1,000 Å. If the thickness of recording layer 2 exceeds 1,000 Å, the threshold of a recording light beam is increased. If the thickness is smaller than 100 Å, recording may become practically impossible.

Immediately after recording layer 2 is formed, the layer in which the metal, semimetal, or semiconductor is very finely dispersed in a matrix formed of carbon and hydrogen is formed. That is, an amorphous state in which no distinctive peak representing the presence of a crystal appears upon X-ray diffractometry is confirmed. In this state, since the metal, semimetal, or semiconductor is effectively protected by carbon and hydrogen, the oxidation resistance of recording layer 2 is extremely high, and hence its stability is also high. If energy, such as heat, exceeding a predetermined value is externally applied to recording layer 2 in such a state, the metal, semimetal, or semiconductor in recording layer 2 coagulates, and recording layer 2 is transformed into a crystalline state in which peaks each representing the presence of a crystal appear upon X-ray diffractometry. This phase-transformation tends to occur easily as its required activation energy is lower. In this embodiment, the composition ratio of carbon, hydrogen, and one of the metal, semimetal, or semiconductor is adjusted so as to set the activation energy required to transform from the amorphous state into the crystalline state to be 1.5 eV or more, preferably 2.0 eV or more.

When the state of recording layer 2 is transformed into the crystalline state, an area where the metal, semimetal, or semiconductor is in contact with air is increased, and hence its resistance to oxidation decreases. However, if the activation energy for the above phase-transformation is 1.5 eV or more, a very stable amorphous state is obtained so that excellent oxidation resistance of recording layer 2 can be maintained for a long period of time.

Figure 2:
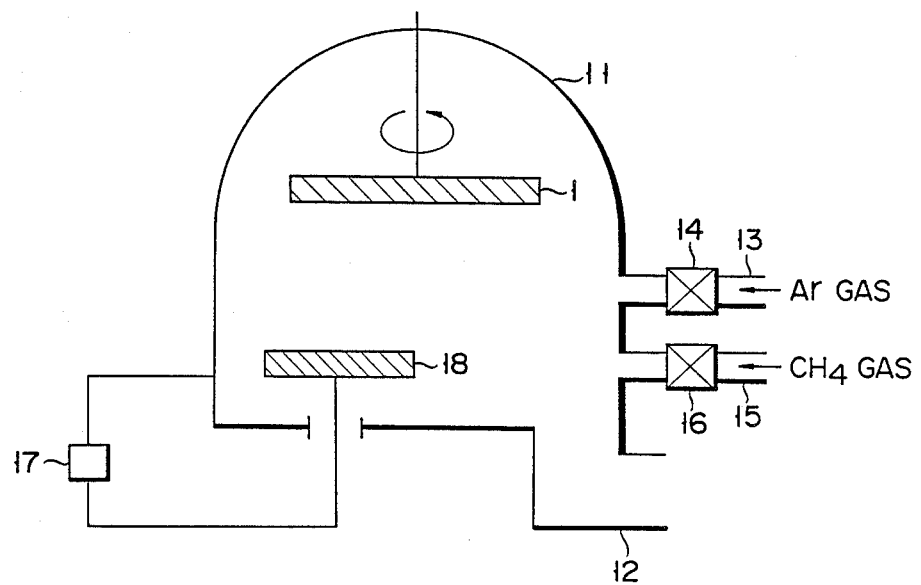
FIG. 2 is a view illustrating an apparatus for manufacturing the information storage medium in FIG. 1.

A method of manufacturing the information storage medium (optical disk) according to this embodiment will be described below with reference to FIG. 2. FIG. 2 shows an arrangement of a sputtering apparatus for manufacturing the information storage medium of this embodiment. Referring to FIG. 2, reference numeral 11 denotes a vacuum chamber. Exhaust port 12 and gas feed ports 13 and 15 are formed in a side wall of vacuum chamber 11. A rotary oil pump and a cryopump (neither of which are shown) are coupled to exhaust port 12 so as to evacuate vacuum chamber 11. Ar and $CH_4$ gas feed units (not shown) are coupled respectively to gas feed ports 13 and 15. In addition, mass flow controllers 14 and 16 are arranged respectively in gas feed ports 13 and 15 so as to feed Ar gas and $CH_4$ gas into chamber 11 at predetermined flow rates. Substrate 1 is placed in chamber 11 with its surface set horizontally, and can be rotated by a rotary unit (not shown). Target 18 is arranged in vacuum chamber 11 so as to oppose substrate 1. DC power source 17 is connected to target 18. Target 18 consists of a metal, semimetal, or semiconductor, such as Te, to be contained in recording layer 2.

In such a film forming apparatus, vacuum chamber 11 is evacuated by the rotary oil pump first and then evacuated by the cryopump to a high vacuum of $5 \times 10^{-6}$ Torr or more. Subsequently, Ar gas and $CH_4$ gas, which are controlled by mass flow controller 14 and 16 at predetermined flow rates, are fed from gas feed ports 13 and 15 into vacuum chamber 11, thereby setting chamber 11 at, e.g., $5 \times 10^{-5}$ Torr. While substrate 1 is rotated at a relatively low speed of about 30 rpm in this state, predetermined power is supplied from power source 17 to target 18 to perform sputtering so as to form recording layer 2 having a predetermined thickness on substrate 1. In this case, the composition of recording layer 2 can be controlled by the flow rate of $CH_4$ gas.

Figure 3:
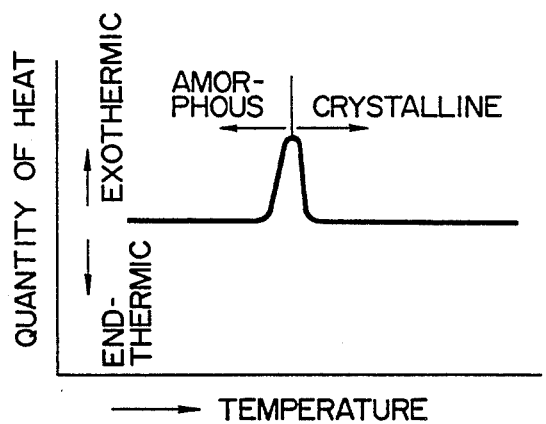
FIG. 3 is a graph of a differential scanning calorimetric analysis when a recording layer is transformed.

A method of obtaining activation energy for the above-described phase-transformation will be described below. If calorimetry is performed by a differential scanning calorimeter (DSC) when an amorphous state is transformed into a state in which peaks representing crystals appear upon X-ray diffractometry, a heat peak is obtained in a temperature-calorie (quantity of heat) curve, as shown in FIG. 3. Therefore, the activation energy ($\Delta Ea$) for this transformation can be obtained by performing Kissinger plotting on the basis of this curve.

An example of Kissinger plotting will be described below.

Since a material in a crystalline state has a smaller quantity of internal energy than in an amorphous state, heat is generated when crystals are transformed from the material in the amorphous state. This heat generation is observed as a calorific value-peak when a DSC method is employed.

A sample is heated at different heating rates c by use of the DSC, and temperature $T_o$ at each calorific value-peak corresponding to each heating rate $\alpha$ is detected.

Next, the detected values are plotted in a coordinate where the ordinate indicates $\ln(\alpha/T_o^2)$ and the abscissa indicates $1/T_o^2$. Since, in this case, the equation of $\ln(\alpha/T_o^2) = -Ea/kT_o$ is satisfied, a linear relation is obtain, and the activation energy can be determined from the gradient thereof.

Figure 4:
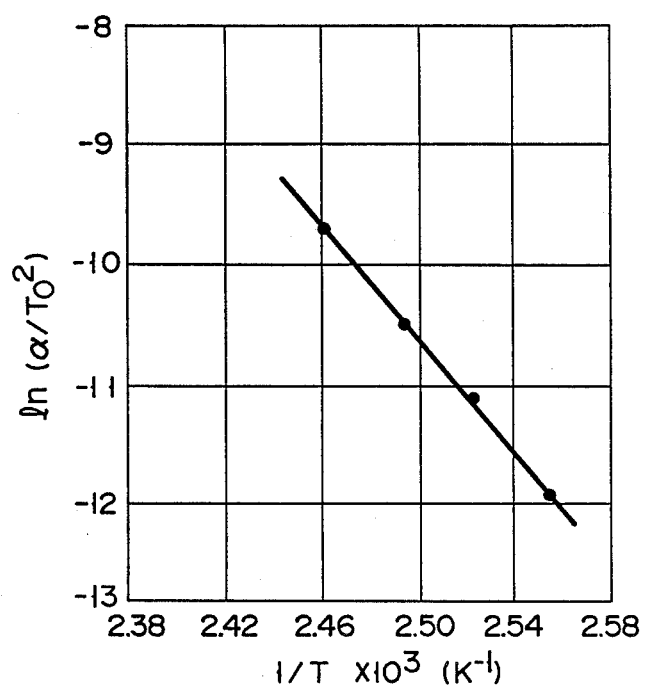
FIG. 4 is a graph showing an example of the Kissinger plot.

FIG. 4 shows an example of Kissinger plotting.

Note that the oxidation resistance of a recording layer of an information storage medium is conventionally examined by an acceleration test at high temperature and humidity for 1,000 hours or more. In the present invention, however, the oxidation resistance of recording layer 2 can be examined by measuring the activation energy for phase transformation. Therefore, stability of a recording layer, e.g., oxidation resistance can be examined within a very short period of time.

EXAMPLE

An example of the present invention will be described below.

A polycarbonate disk substrate was placed in the vacuum chamber, and Te target 18 having a diameter of 5 inches was arranged in the chamber so as to oppose the substrate. Ar gas and $CH_4$ gas were fed into the chamber, and power was supplied to the target in a gas mixture atmosphere, thereby performing sputtering.

Five samples were prepared by changing the ratio of $CH_4$ gas represented by Q (%) in the following equation, as shown in Table 1.

$$Q = \{CH_4 \text{ gas flow rate}/ (CH_4 \text{ gas flow rate} + \text{Ar gas flow rate})\} \times 100 \, (\%) \quad (1)$$

TABLE 1

| Sample Number | 1 | 2 | 3 | 4 | 5 |
|---|---|---|---|---|---|
| Q (%) | 0 | 10 | 30 | 50 | 100 |
| ΔEa [eV] | 0.2 | 1.0 | 1.5 | 2.2 | 2.5 |

Activation energies ΔEa for samples 2 to 5 were obtained by performing Kissinger plotting, as described above. Note that the ΔEa value of sample 1 (Te only) is an established value.

As shown in Table 1, it was confirmed that the activation energy for transformation was increased as the flow rate of $CH_4$ gas was increased, i.e., as the flow rate of $CH_4$ gas was increased, the oxidation resistance of a recording layer was improved, and hence its stability was improved.

Figure 5:
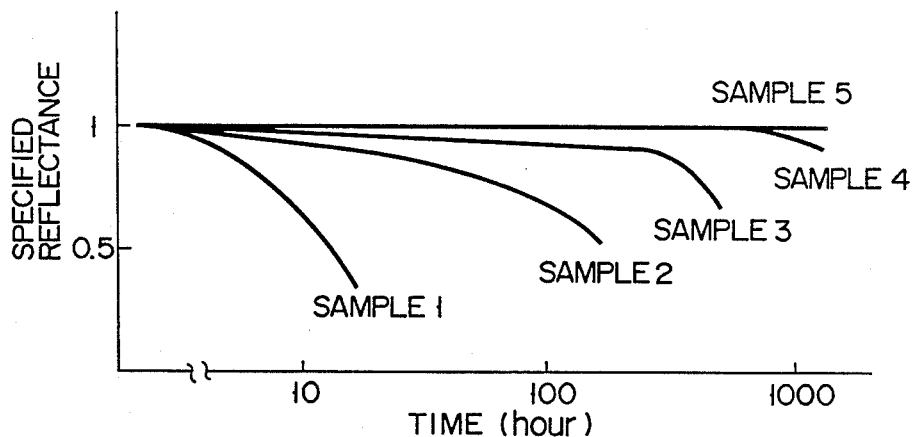
FIG. 5 is a graph showing changes in reflectance as a function of time at high temperature and humidity.

Subsequently, the stability of the recording layers of the samples were examined on the basis of changes in reflectance as a function of time in an atmosphere at a temperature of 65° C. and a humidity of 90%. FIG. 5 is a graph showing changes in reflectance of the recording layers of the respective optical disk samples as a function of time, wherein a time is plotted along the axis of abscissa and a reflectance normalized by setting the initial reflectance to be 1 is plotted along the axis of ordinate. According to this graph, the reflectance of samples having activation energy $\Delta Ea$ of 1.5 eV or more were kept substantially constant for a relatively long period of time. It was found that the reflectances of samples 4 and 5 especially, having activation energy $\Delta Ea$ exceeding 2 eV, went through almost no changes after 1,000 hours. That is, the stabilities of these samples are high.

In contrast to this the reflectance of samples 1 and 2 having low activation energies $\Delta Ea$ were changed within a relatively short period of time. Therefore, it was confirmed that their stabilities were low.

Figure 6A:
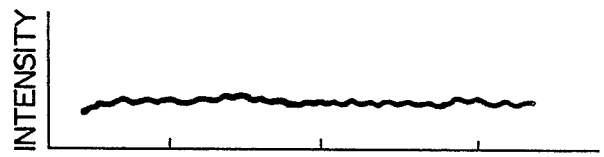
FIGS. 6A to 6C are graphs showing X-ray diffraction patterns in the recording layer.
Figure 6B:
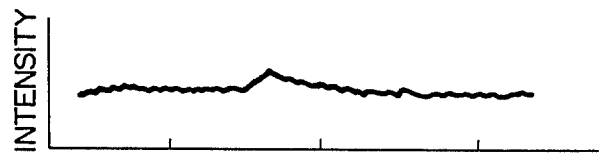
Figure 6C:
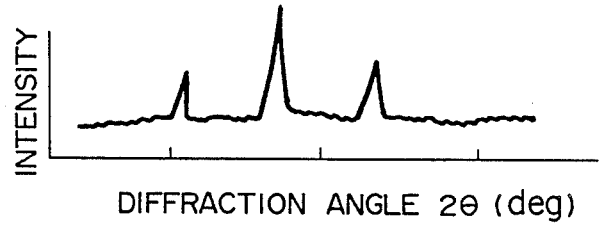

Furthermore, after these samples were kept in an atmosphere at a temperature of 65° C. and a humidity of 90% for 500 hours, X-ray diffraction was carried out for the above samples. FIGS. 6A, 6B, and 6C show X-ray diffraction patterns of the recording layers of the respective samples. FIGS. 6A, 6B, and 6C respectively show the patterns of samples 5, 3, and 1. As shown in FIG. 6C, distinctive peaks representing the presence of crystals were found in sample 1 having low activation energy $\Delta Ea$. As shown in FIGS. 6A and 6B, however, since no distinctive peak representing the presence of a crystal was found in samples 3 and 5 each having high activation energy $\Delta Ea$, it was confirmed that the states of samples were amorphous. As a result, it was confirmed that as activation energy $\Delta Ea$ was increased, phase-transformation from an amorphous state wherein no peak appears upon X-ray diffractometry into a crystalline state wherein crystalline peaks appear became less likely.

What is claimed is:

1. An information storage medium comprising:
   a substrate; and
   a recording layer, provided on said substrate and containing carbon and M (M represents at least one type of element selected from the group consisting of a metal element, a semimetal element, and a semiconductor element),
   said recording layer including an amorphous structure confirmed by X-ray diffractometry, and activation energy required to transform a state of said recording layer from said amorphous state into a crystalline state confirmed by X-ray diffractometry being not less than 1.5 eV.

2. A medium according to claim 1, wherein said recording layer contains hydrogen.

3. A medium according to claim 1, wherein M contains at least one element selected from the group consisting of Te, Se, Bi, Pb, Sb, Ag, Ga, As, and Ge.

4. A medium according to claim 1, wherein said recording layer contains Te.

5. A medium according to claim 4, wherein said recording layer contains a Te-Ag alloy.

6. A medium according to claim 1, wherein the activation energy is not less than about 2.0 eV.

7. A medium according to claim 1, wherein said recording layer has a thickness of about 100 to about 1,000 Å.

8. A method of manufacturing an information storage medium, comprising the steps of:
   preparing a substrate; and
   forming a recording layer on said substrate such that said recording layer contains carbon, and M (M represents at least one type of element selected from the group consisting of a metal element, a semimetal element, and a semiconductor element), said recording layer including an amorphous structure confirmed by X-ray diffractometry, and activation energy required to transform a state of said recording layer from said amorphous state into a crystalline state confirmed by X-ray diffractometry being not less than 1.5 eV.

9. A method according to claim 8, wherein said recording layer contains hydrogen.

10. A method according to claim 8, wherein M contains at least one element selected from the group consisting of Te, Se, Bi, Pb, Sb, Ag, Ga, As, and Ge.

11. A method according to claim 8, wherein said recording layer contains Te.

12. A method according to claim 11, wherein said recording layer contains a Te-Ag alloy.

13. A method according to claim 8, wherein the activation energy is not less than about 2.0 eV.

14. A method according to claim 8, wherein said recording layer has a thickness of about 100 to about 1,000 Å.

15. An information storage medium manufactured by a method comprising the steps of:
    preparing a substrate; and
    forming a recording layer on said substrate such that said recording layer contains carbon, and M (M represents at least one type of element selected from the group consisting of a metal element, a semimetal element, and a semiconductor element), said recording layer including an amorphous structure confirmed by X-ray diffractometry, and an activation energy required to transform a state of said recording layer from said amorphous state into a crystalline state confirmed by X-ray diffractometry being not less than 1.5 eV.

16. A method according to claim 8, wherein said step of forming said layer comprises a sputtering process in which the flowrate of carbon-containing gas is controlled to achieve a layer having an activation energy of at least 1.5 eV.

17. A method according to claim 8, wherein said step of forming said layer comprises a sputtering process in which the flowrate of carbon-containing gas is controlled to achieve a layer having an activation energy of at least 2.0 eV.

18. An information storage medium according to claim 15, wherein said step of forming said layer comprises a sputtering process in which M is sputtered onto said substrate while controlling the flowrate of carbon-containing gas such that a layer having an activation energy of at least 1.5 eV is formed.

19. An information storage medium according to claim 15, wherein said step of forming said layer comprises a sputtering process in which M is sputtered onto said substrate while controlling the flowrate of carbon-containing gas such that a layer having an activation energy of at least 2.0 eV is formed.

20. An information storage medium according to claim 1, wherein M is very finely dispersed in a matrix formed of carbon and hydrogen.

21. An information storage medium according to claim 18, wherein M is very finely dispersed in a matrix formed of carbon and hydrogen.

22. A method according to claim 16, wherein M is very finely dispersed in a matrix formed of carbon and hydrogen.

* * * * *